Aug. 23, 1949.    S. P. ROBINSON    2,479,781
PURIFICATION OF HYDROGEN SULFIDE
Filed Aug. 31, 1945
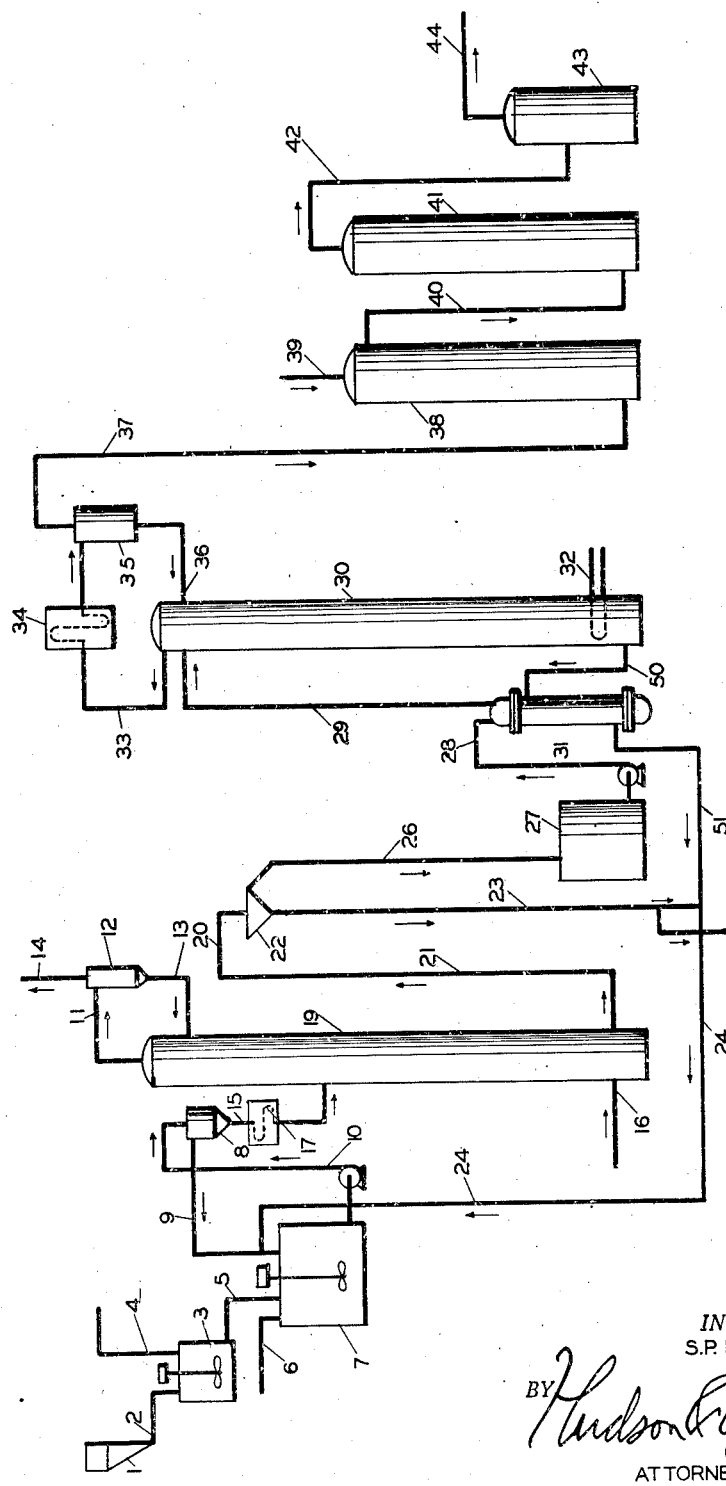
INVENTOR.
S.P. ROBINSON
BY
ATTORNEYS Patented Aug. 23, 1949

2,479,781

UNITED STATES PATENT OFFICE 2,479,781

PURIFICATION OF HYDROGEN SULFIDE

Sam P. Robinson, Bartlesville, Okla., assignor to Phillips Petroleum Company, a corporation of Delaware Application August 31, 1945, Serial No. 613,756

5 Claims. (Cl. 23—181)

This invention relates to the treatment of gases. In one of its more specific aspects it relates to a process for the purification of hydrogen sulfide gas.

Hydrogen sulfide occurs in nature, is formed as a by-product in some manufacturing operations, and is evolved as a product in the decomposition of certain sulfur containing substances; this latter source, however, is of little or no importance other than involving problems of disposal.

The occurrence of hydrogen sulfide in nature is relatively widespread, usually some is found in petroleum oils and hydrocarbon gases as well as in coals and oil shales. These materials ordinarily contain other types of sulfur containing compounds and when processed additional hydrogen sulfide is frequently produced.

Natural hydrocarbon gases frequently contain other impurity gases in addition to hydrogen sulfide, as for example, carbon dioxide, nitrogen and even small amounts of oxygen. Similarly, gases formed in the processing of liquid hydrocarbon materials contain largely hydrocarbon gases, considerable hydrogen sulfide, some carbon dioxide, nitrogen and other gases in smaller amounts. Sulfur in most any form appears to be deleterious to hydrocarbon products, hence many and varied operations are directed to removal of sulfur compounds.

Hydrogen sulfide removal from hydrocarbon liquids or from gases is not especially difficult. Formerly and even yet many liquid hydrocarbon materials are treated with caustic alkali solutions. Some materials can be processed by fractionation for $H_2S$ removal. Gaseous hydrocarbon materials can also be treated wtih caustic alkali solutions but since the caustic is consumed in such operations, chemical costs are high when considerable hydrogen sulfide is present.

When a caustic alkali is used for hydrogen sulfide removal, as sodium hydroxide, a sodium sulfide material is formed. This compound is rather stable and would require treatment with an acid, such as sulfuric acid, to liberate the hydrogen sulfide in case this latter compound is to be recovered as a commercial product. In any event the sodium hydroxide is not regenerated and its consumption has to be charged to cost of chemicals.

Certain organic amine solutions possess the property of absorbing acidic gases, such as hydrogen sulfide, sulfur dioxide or carbon dioxide at atmospheric temperature and releasing the absorbed gases at higher temperatures with the simultaneous regeneration of the amine solution. Thus by use of such acidic gas extractants chemical costs are relatively low. However, these amine solutions are not selective in their action and any acidic gas present will be absorbed at the lower temperatures and evolved at the higher temperatures.

When an amine solution is used to extract hydrogen sulfide from a hydrocarbon gas containing some carbon dioxide both these gases are extracted. Likewise, upon regeneration of the amine solution both gases are expelled at the regeneration temperature. In case hydrogen sulfide is to be recovered as a product it will be contaminated with the carbon dioxide. Thus, the main object of this invention is to provide a process for the separation of carbon dioxide from hydrogen sulfide.

Another object of this invention is to provide a process for the purification of hydrogen sulfide containing minor quantities of carbon dioxide and other gases.

Still another object of my invention is to provide a smoothly operating, continuous process adaptable to the removal of carbon dioxide and some other gases from gaseous hydrogen sulfide.

Yet another object of my invention is to provide a process for producing hydrogen sulfide gas of high purity from a gaseous mixture of hydrogen sulfide, carbon dioxide and some other gases.

Still other objects and advantages will be apparent to those skilled in the art from a careful study of the following description and attached drawing which respectively describes and illustrates a preferred embodiment of my invention, and wherein The drawing represents diagrammatically one form of apparatus for carrying out the process of my invention.

Broadly speaking, the process of my invention may be summarized as follows:

The hydrogen sulfide containing stream is contacted in an absorber with a lime slurry, producing a solution of calcium hydrosulfide in water, according to the equation:

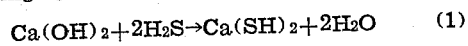   (1)

The hydrogen sulfide is then recovered from this solution by subjecting the latter to conditions of increased temperature such that Equation 1 is reversed,

   (2)

Simultaneous with the Reaction 1 is a reaction of lime and carbon dioxide, since both gases are present in the gas being treated.

$$Ca(OH)_2 + CO_2 \rightarrow CaCO_3 + H_2O \quad (3)$$

This calcium carbonate being precipitated in the presence of water and maintained wet is relatively reactive, and accordingly reacts with both carbon dioxide and hydrogen sulfide, as follows:

$$CaCO_3 + CO_2 + H_2O \rightarrow Ca(HCO_3)_2 \quad (4)$$

$$2CaCO_3 + 2H_2S \rightarrow Ca(HCO_3)_2 + Ca(SH)_2 \quad (5)$$

Calcium bicarbonate from both sources, that is, Equations 4 and 5, reacts with hydrogen sulfide.

$$Ca(HCO_3)_2 + 2H_2S \rightarrow Ca(SH)_2 + 2CO_2 + 2H_2O \quad (6)$$

At a somewhat higher temperature, it is well known that calcium bicarbonate loses carbon dioxide with the formation of the normal carbonate, $$Ca(HCO_3)_2 \rightarrow CaCO_3 + CO_2 + H_2O \quad (7)$$

This normal carbonate may be consumed according to Reactions 4 and/or 5.

A separate series of reactions resulting from the direct combination of hydrogen sulfide with the hydrated lime, occurs:

$$Ca(OH)_2 + H_2S \rightarrow CaS + 2H_2O \quad (8)$$

The calcium sulfide as formed may react separately with hydrogen sulfide and with water, as $$CaS + H_2S \rightarrow Ca(SH)_2, \text{ and} \quad (9)$$

$$2CaS + 2H_2O \leftrightarrows Ca(SH)_2 + Ca(OH)_2 \quad (10)$$

Any calcium polysulfide, such as $CaS_5$, which may be formed in such a complex system may also react with hydrogen sulfide with the formation of elementary sulfur, as $$CaS_5 + H_2S \rightarrow Ca(SH)_2 + 4S \quad (11)$$

Without doubt, many other reactions may occur in a system of so many components, which are not clearly understood.

Of all these compounds, hydrogen sulfide and carbon dioxide are gases and originate from the impure gas being treated according to the process as herein described.

$Ca(OH)_2$, $CaS$, $CaCO_3$, $S$, and $CaS_5$ are solids and are maintained in my process with water as a suspension or slurry.

$Ca(SH)_2$ and $Ca(HCO_3)_2$ are for the most part water soluble, the former, in fact, is quite soluble in water. It is known, also, that the calcium bicarbonate compound rather easily decomposes, even at moderate temperatures.

Referring to the drawing, lime from a hopper 1 passes by a transfer means 2 to a slurry tank 3. Water from a source, not shown, passes into the slurry tank through a pipe 4. A mixing device or stirrer is kept in motion in this tank to prepare new lime slurry to be added to the system as makeup slurry is needed. This new slurry accordingly passes from this slurry tank through a pipe 5 into a slurry surge tank 7. A water line 6 furnishes water to this surge tank in case the regenerated slurry has become unduly thickened.

From this run tank 7 slurry is continuously pumped through a pipe 10 to a constant head feeder box 8 which is equipped with an overflow line 9 which serves to return overflow slurry to the surge tank 7. In this manner a constant level or head of slurry can be maintained in the feeder box at all times. Feed slurry accordingly passes from this box through a feed line 15 into a primary or gas absorption tower 19 at a point some distance below the top thereof. Hydrogen sulfide gas to be treated enters the absorber at a point near the base through a pipe 16 from a source, not shown. Unabsorbed gas leaves by way of an overhead line 11 and passes to a separator vessel 12 in which entrained slurry is separated so that the gas finally exiting through a line 14 will be lime free or substantially so. Provision is accordingly made for return of slurry so separated through a return line 13 to the top of the absorber.

In the operation of this absorption step, the hydrogen sulfide gas containing some carbon dioxide, hydrogen gas, nitrogen and the like, enters the absorber 19 through the raw gas line 16. The calcium hydroxide-water slurry enters the tower through the feed line 15 and passes downward through the lower portion of the tower in countercurrent contact with the rising stream of gases being treated. By using a rather long and narrow column, such as about 60 feet high by 2 feet inside diameter, I have found that no plates or packing material is necessary. Thus by operating in a "flooded column" manner with such a slurry excellent contact between slurry and gas is obtained. By omission of plates or other contact promoting means a much less costly column can be used.

I prefer to operate such an absorption column at substantially atmospheric pressure, and at a temperature within 60° to about 160° F. A preferred temperature, I have found, is about 130° F. and to maintain such a preferred temperature a heater 17 is installed in the slurry inlet line 15. The hydrogen sulfide gas to be purified enters the absorber through line 16 and bubbles upward in the column through the downward flowing slurry.

In this absorption column Reactions 1, 3, 5, 6, 8, 9, 10 and 11 take place, that is, hydrogen sulfide reacts with the hydrated lime to form the water soluble calcium hydrosulfide, some calcium sulfide, the latter reacting with additional hydrogen sulfide to form more hydrosulfide. Similarly, any $CaS_5$ present will also react with $H_2S$ to form the soluble bisulfide. The carbon dioxide impurity is also reactive under absorber conditions, it reacts with hydrated lime to form calcium carbonate which in turn reacts with hydrogen sulfide to form water soluble calcium bicarbonate and the bisulfide. In addition calcium carbonate may react according to Reaction 5 as mentioned or a part may react with carbon dioxide according to Reaction 4 to form calcium bicarbonate.

From the base of the absorber the slurry carrying a charge of newly formed precipitates, calcium hydroxide and soluble salts passes through a slurry line 21 to the top of a cone type classifier or dewatering vessel 22. Such a classifier may be an ordinary Allen cone classifier such as is used to classify or thicken slimes in ore treating mills. In this vessel settling of solid material occurs while the water or solution overflows from the top edge of the cone. The solids issuing through the apex of the classifier pass through a line 23 and a line 24 which joins the slurry overflow line 9 so that the contents of both lines 9 and 24 flow into the slurry run tank 7.

The overflow water or solution from the classifier passes through a line 26 into a solution surge tank 27. From this intermediate storage the solution is pumped through a line 28 to a heat exchanger 31 and thence through a charge line 29 into the top of the desorption or decomposer vessel 30. A steam coil 32 is included in the base of this column making a "reboiler" or "kettle" section, so to speak. A temperature of about 280° F. is maintained in this reboiler section for decomposition of the calcium hydrosulfide into hydrogen sulfide and calcium hydroxide according to the Equation 2, previously given. The liberated hydrogen sulfide gas leaves the top of the vessel 30 and passes through a line 33 and a cooler 34 into separator vessel 35. In this small vessel entrained water is separated from the gas as well as water condensed in cooler 34. This condensed and cooled water returns from the separator by way of a return line 36 to the vessel 30. From the separator 35 the hydrogen sulfide passes through a line 37 into a dehumidifier tank 38 into which cooling water from a line 39 enters. In this tank 38 the moist and warm hydrogen sulfide is cooled and in cooling loses considerable of its moisture content. From this vessel the gas passes through a line 40 into a dehydrator or drying vessel 41, such as a bauxite drier. This drier may be one vessel or may be several in series or so arranged that while one or more are in service, the remaining are being dried preparatory to reuse. From the drying zone the gas leaves by way of a line 42 and enters a surge tank or intermediate storage vessel 43. From this tank the gas passes through a pipe 44 to such disposal as desired.

The lime or more specifically the calcium hydroxide reformed according to Equation 2 in the decomposer vessel 30 is withdrawn from the base of this vessel through a line 50 and passes through the exchanger 31 and on through a line 51 to be combined with the cone 22 settlings at the point of junction of lines 51 and 23.

While a reboiler temperature of 280° F. was mentioned in conjunction with the operation of the decomposer 30, it is not necessary to operate at this specific temperature since operation is successful at both higher and lower temperatures. All that is necessary is to use a sufficiently high temperature that a reasonable portion of the H$_2$S will be evolved so that the remaining liquid containing some lime will be receptive to absorb more H$_2$S when recycled to the absorber 19.

The upper limit of decomposer temperature will be decided by pressure allowable in the decomposer 30 as well as thermal stability of the chemical materials passing through the tower. I have found 250° to 300° F. to be preferred temperatures. Actual boiling promotes H$_2$S evolution but is not necessary so temperatures as low as 150° to 160° F. may be used.

The reactions which take place in the absorber vessel 19 are important in determining the purity of the final hydrogen sulfide. A typical feed stock to such an absorber 19 contained 80 per cent H$_2$S, 4 per cent CO$_2$, 16 per cent hydrocarbons, and traces of oxygen and nitrogen. To separate successfully some members of the group of acidic gases is a problem of long standing, and specifically the separation of H$_2$S from CO$_2$ is difficult since these gases possess nearly equal acidities. Both gases are absorbed by the Ca(OH)$_2$ and nearly to the same extent so that it is only by the most careful control of absorber operation that a satisfactory separation of these two gases can be made.

The hydrogen sulfide entering the absorber 19 may react according to Equations 1, 5, 6, 8, 9 and 11 and at the same time carbon dioxide may compete with the hydrogen sulfide according to Equations 3 and 4. The extent to which any one of these reactions will occur depends upon the relative concentration of the two gases and the alkalinity of the calcium compounds involved. Because of the greater alkalinity of the Ca(OH)$_2$, which is a relatively strong base, Reactions 3 and 8 will predominate in that portion of the absorber in which Ca(OH)$_2$ is present in high concentration, that is, near the point of addition to slurry, line 15. As the slurry passes down the tower the alkalinity of the slurry is lessened as the concentration of the Ca(OH)$_2$ decreases to the extent that Reactions 5 and 9 take place. Reaction 5 predominates over Reaction 4 because of the greater concentration of hydrogen sulfide as compared with the carbon dioxide. Since calcium bicarbonate is unstable at relatively low temperatures, its formation at my operating temperatures of 60° to 160° F. is somewhat retarded and accordingly at least a portion of this gas (CO$_2$) is not absorbed and passes out through the gas lines 11 and 14 to waste or such disposal as desired. From another consideration the solubility of the Ca(HCO$_3$)$_2$ in the solution is small due to the high concentration of calcium ion from the highly dissociated compound Ca(SH)$_2$, the major portion of the calcium bicarbonate being in the form of a precipitate. In the presence of a high concentration of H$_2$S Reaction 6 tends to occur which further reduces the bicarbonate concentration and the higher the absorber temperature the greater will be the tendency for Reaction 7 to take place. The net result of these reactions as promoted by temperatures of about 130° F. and by high concentrations of hydrogen sulfide is to convert the calcium to Ca(SH)$_2$ and eliminate the CO$_2$.

A very important aspect of the present invention as regards the efficiency of the separation between the H$_2$S and the CO$_2$ lies in the point of introduction of the fresh lime slurry into the absorption tower 19. At the point of introduction of highly alkaline new lime slurry, hydrogen sulfide and carbon dioxide react with the new lime according to Equations 8 and 3, as follows:

$$\text{Ca(OH)}_2 + \text{H}_2\text{S} \rightarrow \text{CaS} + 2\text{H}_2\text{O} \quad (8)$$
$$\text{Ca(OH)}_2 + \text{CO}_2 \rightarrow \text{CaCO}_3 + \text{H}_2\text{O} \quad (3)$$

Since CaS is not stable in aqueous solutions, this compound decomposes in the presence of water according to Reaction 10.

$$2\text{CaS} + 2\text{H}_2\text{O} \rightarrow \text{Ca(OH)}_2 + \text{Ca(SH)}_2 \quad (10)$$

The acidic gases continue to react at points below the point of addition of the lime solution according to Equations 9 and 4, as follows:

$$\text{H}_2\text{S} + \text{CaS} \rightarrow \text{Ca(SH)}_2 \quad (9)$$
$$\text{CO}_2 + \text{CaCO}_3 + \text{H}_2\text{O} \rightarrow \text{Ca(HCO}_3)_2 \quad (4)$$

Further down the tower where the higher concentration of H$_2$S in the gas finds less concentrations of Ca(OH)$_2$ and CaS with which to react, Equation 5 then occurs.

$$2\text{H}_2\text{S} + 2\text{CaCO}_3 \rightarrow \text{Ca(HCO}_3)_2 + \text{Ca(SH)}_2 \quad (5)$$

By this time this reaction occurs the solution is becoming saturated with Ca(HCO$_3$)$_2$ and Reaction 4 begins to reverse itself as Reaction 7.

$$\text{Ca(HCO}_3)_2 \rightarrow \text{CO}_2 + \text{CaCO}_3 + \text{H}_2\text{O} \quad (7)$$

The concentration of the Ca(HCO$_3$)$_2$ is further depressed by the increased calcium ion concentration resulting from the high concentration of the Ca(SH)$_2$ in the solution so that the carbon dioxide gas coming into the absorber with the $H_2S$ has substantially nothing with which to react. Thus in the region of the absorber in which there is a relatively high concentration of $Ca(SH)_2$ and a high concentration of $H_2S$ in the incoming gas, there is little absorption of $CO_2$.

One of the conditions for preventing absorption of $CO_2$, as mentioned hereinbefore, is a relatively high concentration of $H_2S$ gas. If the point of addition of new lime were at the top of the countercurrently operated absorber tower, then to absorb $H_2S$ and not to absorb $CO_2$ would require a relatively high concentration of $H_2S$ at the exit point of the gas and this operation would permit the loss of large quantities of $H_2S$ in order to produce some $H_2S$ free from $CO_2$.

I have discovered that if I add the new lime at about the midpoint of the absorber I can eliminate substantially all of the $CO_2$ and yet make a good recovery of the $H_2S$ in a relatively pure condition.

In the upper portion of my absorber, that is at the point of addition of new lime and above, $CO_2$ and the remaining $H_2S$ are both absorbed. As slurry containing considerable $CO_2$ in combination from the upper portion of the absorber is agitated by upward flowing gases and works its way downward to the point of addition of the new lime, then the carbon dioxide in combination begins to be released from the slurry and is carried by the $H_2S$, hydrocarbon gases and nitrogen that pass upward through the tower.

The overall operation of the absorber may be summarized as follows: In the upper portion of the tower $H_2S$ and some of the $CO_2$ are absorbed by the slurry. This slurry in contact with new slurry and gas having a high concentration of $H_2S$ in the lower portion of the tower absorbs more $H_2S$ with the evolution of the already absorbed $CO_2$. This evolved $CO_2$ with the $H_2S$ not absorbed and the inert hydrocarbon gases and nitrogen pass to the upper portion of the absorber where the remaining $H_2S$ and some $CO_2$ are absorbed, the unabsorbed $CO_2$ being carried out with the effluent gaseous hydrocarbons and nitrogen. Thus by operating this absorber according to the method of my invention I am able to make a selective separation between carbon dioxide gas and hydrogen sulfide gas and yet recover substantially all of the hydrogen sulfide as a commercially pure product.

The slurry is withdrawn from the bottom of the absorber 19 and passed through line 21 to the cone classifier 22. Another important point of my invention lies in the function of this classifier. Prior processes which utilized lime for $H_2S$—$CO_2$ treatment passed the entire slurry from the absorber to the decomposed tower 30. I have found that if the liquid portion of the slurry is separated from the solids and the "liquid only" is passed to the decomposer 30 that a still purer hydrogen sulfide product is obtained.

By explanation given hereinbefore, it was shown that the solution portion of the slurry was relatively concentrated with respect to the calcium bisulfide compound and that the solid portion of the slurry might carry some calcium carbonate so that by separating the solids from the solution and heating the solution only for recovery of hydrogen sulfide, a relatively pure product is obtained. By so operating I am able to make a hydrogen sulfide product containing 99.5 per cent plus of this gas.

The solids separated in the cone classifier, which substantially is merely a "thickener" or a "settler," contains unreacted calcium hydroxide, calcium sulfide, calcium carbonate and calcium pentasulfide. All of these solid compounds are reactive to hydrogen sulfide with the formation of soluble $Ca(SH)_2$ and when separated in the cone and returned to the absorber with additions of new or makeup lime as needed, make a fully reactive recycle material.

The liquid portion separated from the solids of the slurry overflows the rim of the classifier 22 and passes by line 26 into a run storage or surge tank 27. From this tank the liquid is pumped through line 28, heat exchanger 31, and line 29 into the top of the decomposer tower 30. A steam coil 32 in this vessel maintains a "reboiler" temperature of about 280° F. which temperature is ample for effecting the decomposition of the calcium bisulfide to hydrogen sulfide with the regeneration of active calcium hydroxide. This latter compound precipitates since it is not very soluble in water, is removed from the base of the tower by line 50 and passes through heat exchanger 31 in indirect heat exchange with charge solution for the decomposer. This partially cooled solution from the exchanger then passes through the transfer line 51 into surge tank 7. In case additional cooling for this returned solution and lime is necessary to maintain the temperature of the material in tank 7 at the proper value, an additional cooler may be inserted at a convenient place, as desired.

Since the decomposition reaction in decomposer 30 takes place at a relatively high temperature, the hydrogen sulfide issuing through the overhead gas line 33 carries considerable moisture as steam. This wet gas then passes through the cooler 34 in which considerable moisture is condensed. The water separates from the gas in the accumulator 35 and returns to the tower through line 36. In this manner the amount of makeup water needed is materially lessened.

The hydrogen sulfide issuing from the accumulator 35 is still warm and moist and is accordingly passed through the line 37 into a sort of dephlegmator or cooling vessel 38 into which cool liquid water is sprayed in direct contact with the moist gas. In this manner considerable moisture is condensed and the hydrogen sulfide passing from this vessel through the line 40 has lost about half of its moisture content. I have operated this dephlegmator or dehumidifier vessel 38 so that the temperature of the outgoing gas is approximately 85° F. This partially dried gas then passes to other drying steps, such as to vessel or vessels 41 which may be a single or multiple dryers as found necessary. Bauxite or other suitable dryers, as are known to the art, may be used. Since the gas to be dried contains considerable moisture, any driers may need to be regenerated at intervals. Accordingly, several vessels should be provided so that when one is on process the other may be on regeneration. The dried gas passes from the dryers by line 42 to a surge or product run tank 43 from which the prepared gas passes by the line 44 to such disposal as desired.

Several advantages become evident from the use of the cone classifier for separation of the solids from the liquid prior to decomposition of the $Ca(SH)_2$ in the liquid phase.

(a) Elimination of need for agitation equipment in storage tank 27.

(b) By removal of residual $CaCO_3$, no opportunity is afforded for decomposition of this compound in the decomposer; such a decomposition would evolve $CO_2$ which in turn would contaminate the hydrogen sulfide product.

(c) Removal of solid or excess $Ca(OH)_2$ favors decomposition of the $Ca(SH)_2$ by the absence of material with which the evolved hydrogen sulfide could recombine. Such a recombination would tend to produce $CaS$ and $CaS_5$, the latter breaking down ultimately to produce free sulfur.

(d) By separating the above mentioned solids, all of which have a lower alkalinity than fresh or regenerated $Ca(OH)_2$, and mixing these separated solids with some fresh lime permits a better control of alkalinity in the absorber tower which in turn results in better absorptive selectivity of $H_2S$ over $CO_2$.

In the operation of my process I have found it advantageous to operate the absorber at a temperature between atmospheric and a maximum of about 160° F., preferably about 130° F., and at substantially atmospheric pressure. In order to operate the absorber 19 at atmospheric pressure and with a minimum of valves in the slurry lines, I use the constant head orifice box 8, in which provision is made for excess slurry to overflow and return to the slurry run tank 7. In this orifice box 8 an orifice is provided through which a constant volume of slurry can flow and this constant volume flows through the charge line 15 into the absorber. No valves are used in this charge line. The slurry exiting from the base of the absorber passes through the transfer pipe 21 into the cone classifier. This transfer pipe has an elevated loop 20 just prior to the classifier. The elevation or height of this loop determines the level or height of slurry in the absorber tower 19. Line 21 contains no valves. Thus by using the constant head orifice feed box 8 and the discharge tower level loop 20 it is possible to operate the absorber under atmospheric or substantially atmospheric pressure and yet maintain a high column of slurry therein.

The cone classifier contents are at substantially the temperature of the absorber.

By maintaining a bottom decomposer tower (30) temperature of about 280° F., the heat exchange afforded thereby in exchanger 31 raises the temperature of the separated calcium bisulfide containing liquor to about 200° F. This liquor is then charged into the decomposer at this temperature, but increases in temperature upon entrance due to the addition of reboiling heat by coil 32. It is not necessary to maintain these specific temperatures since as a reboiler temperature it is merely necessary to make certain that the temperature is high enough to decompose a sufficient amount or proportion of the $Ca(SH)_2$ that the recycling slurry will be absorptive to $H_2S$ while excluding the carbon dioxide. The pressure carried on the decomposer may be about 35 pounds per square inch or sufficient to permit the required temperature for decomposition of calcium bisulfide in a liquid environment.

I have carried a pressure of 8 to 10 pounds per square inch in the dehumidifier vessel 38, merely sufficient to insure flow of gas. Pressure in the dryer vessel or vessels 41, also may be just that required to cause proper flow of hydrogen sulfide.

I have found that special corrosion resistant equipment is not necessary for the operation of my process. While some portions of the equipment will in time become corroded and need to be replaced, this replacement has not been excessive. The use of special equipment will, of course, reduce such corrosion, it being only a matter of economics of steel parts replaced occasionally versus more expensive alloy parts replaced at longer intervals.

I have found that magnesium hydroxide may be used, substantially, in place of the calcium hydroxide. Magnesium hydroxide absorbs hydrogen sulfide with the formation of a soluble magnesium bisulfide which may be decomposed by heat. The chemical reactions occurring with the magnesium hydroxide are similar to those when calcium hydroxide is used. Absorber temperature may be about the same, as well as the decomposer temperature. However, I have found that when using a magnesium hydroxide slurry that its selectivity for hydrogen sulfide over carbon dioxide is not quite so advantageous for the production of a high purity product. By using magnesium hydroxide I am able to separate hydrogen sulfide from a mixture of gases containing carbon dioxide and to recover hydrogen sulfide having a purity of about 97 per cent. The chief or substantially the only component impurity is carbon dioxide. This operation may be compared with a 99.5 per cent purity hydrogen sulfide when using the calcium hydroxide slurry.

I have further found that mixtures of calcium hydroxide and magnesium hydroxide may be used according to my invention. The greater the proportion of magnesium hydroxide in the slurry, the less selective is the slurry mixture for hydrogen sulfide over carbon dioxide in the absorber. However, I have found that as much as 5 to 10 per cent magnesium hydroxide may be used with the calcium slurry without substantial degradation of the recovered hydrogen sulfide. If as much as 1 per cent $CO_2$ is permissible in the final product, then as much as 20 to 25 per cent magnesium hydroxide with calcium hydroxide may be used.

However, due to the inexpensiveness of slaked lime, it is preferable to use the calcium hydroxide alone.

Valves and pumps, controllers, and such auxiliary equipment have not been shown for purposes of simplicity since the installation of such at desired points is within the knowledge and experience of those skilled in the art.

It will be obvious that operating pressures and temperatures may be varied from the values given and yet remain within the intended scope of my invention. The operating conditions of temperature and pressure and the like given hereinbefore were merely exemplary.

By elimination of pumps, valves or other constrictions imparting unintentional agitation to the slurry in the line between the base of the absorber 19 and the slurry settler 22, the slurry is in such a condition that quick settling of solids and complete separation of solution and solids are obtained.

The settler vessel 22, generally termed a classifier, is not a classifier in the strict sense of the term since no classification of solid material is intended. The only purpose for this piece of apparatus is to make a separation of the solid matter from the liquid or rather to separate the liquid from the solid so that the liquid alone may pass to the decomposer for the recovery of pure $H_2S$. A conical type settler is advantageous since it quietly and effectively and without agitation delivers the settled material to a single point of withdrawal.

Other types of equipment that separate liquids and solids may be used in place of the settler 22 or in conjunction with the settler if it is desired to effect a perfect or nearly perfect removal of solid matter from the liquid prior to passage of the latter to the decomposer vessel. Such complete removal of solid matter assists in making a hydrogen sulfide product of highest purity.

As mentioned hereinbefore the pressure carried in the decomposer may be in the vicinity of about 35 pounds per square inch to permit substantial decomposition of the calcium bisulfide in a liquid aqueous phase. The pressure should be such as to force the liberated hydrogen sulfide through the subsequent drying steps and to cause flow of the regenerated aqueous lime solution from the decomposer kettle through line 50, heat exchanger 31 and lines 51 and 24 into the storage tank 7 without the use of pumps. While this non-use of pumps is not a necessity, it is a distinct advantage.

The unit 17 has herein been termed a heater but is merely a heat exchanger since it may be used as a heater during coming on stream periods and may be used as a cooler in case the heat of neutralization of $H_2S$ and $Ca(OH)_2$ tends to maintain too high a temperature for the best selective absorption of $H_2S$ over $CO_2$ in the absorber. During some periods the exchanger 17 may not be needed at all, but it is installed mainly for starting up periods and for insurance against overheating in the absorber.

In the normal continuous operation of my process as herein described, not much new lime slurry need ordinarily be added. Of course, makeup lime is added to maintain a given amount of active material in the system to replace mechanical losses. Also the rate of addition of new lime slurry is at least in part determined by need for control of the alkalinity of the slurry for best selective absorption of $H_2S$ and rejection of $CO_2$. This latter may well be determined by trial.

In addition, I do not wish to limit my invention in any way by the several chemical equations and reactions given since many individual and specific reactions may occur in so complex a system. Equilibrium in such a complex and multicomponent system is very difficult to determine. Regardless of the specific intermediate reactions which might take place in the absorber and in the decomposer, I am able to treat with a lime slurry an impure hydrogen sulfide gas containing appreciable carbon dioxide and to recover a relatively pure hydrogen sulfide product with a good yield.

Having disclosed my invention, I wish to be limited only by the appended claims.

I claim:

1. A process for the purification of hydrogen sulfide gas containing as impurities some carbon dioxide and gases inert to treatment as hereinafter defined comprising continuously maintaining a body at a high level of a first aqueous slurry of a hydroxide of a metal selected from the group consisting of calcium and magnesium in an elongated contacting zone, introducing said gas to be purified into the bottom of said zone and removing said gaseous impurities as one product of the process from the top of said zone, introducing said first aqueous slurry of a hydroxide of a metal selected from the group consisting of calcium and magnesium at an intermediate point of the body and removing contacted slurry from the bottom thereof, separating said removed slurry into an aqueous solution and a thickened pulp, heating the separated aqueous solution to liberate hydrogen sulfide and to form a second aqueous slurry and recovering said hydrogen sulfide in a purified condition as the main product of the process, cooling the second aqueous slurry, adding said cooled slurry to said thickened pulp to form said first aqueous slurry and returning said first aqueous slurry to said body at said intermediate point.

2. The process of claim 1 wherein said aqueous slurry comprises calcium hydroxide.

3. The process of claim 1 wherein said aqueous slurry comprises magnesium hydroxide.

4. The process of claim 1 wherein the contacting zone is maintained at a temperature of from 60° to 160° F. and at atmospheric pressure.

5. The process of claim 1 wherein the contacting zone is maintained at a temperature of 130° F. and at atmospheric pressure, and the hydrogen sulfide liberation step is carried out at a temperature of 280° F. and at a pressure of 35 pounds per square inch.

SAM P. ROBINSON.

REFERENCES CITED

The following references are of record in the file of this patent:

UNITED STATES PATENTS

| Number | Name | Date |
|---|---|---|
| 1,523,845 | Sperr | Jan. 20, 1925 |
| 1,580,452 | Sperr | Apr. 13, 1926 |
| 1,930,875 | Ford et al. | Oct. 17, 1933 |

OTHER REFERENCES

Handbook of Chemistry and Physics, 28th Ed., Chemical Rubber Co., Cleveland, Ohio, 1944, pages 362 and 363.

Certificate of Correction

Patent No. 2,479,781 August 23, 1949

SAM P. ROBINSON

It is hereby certified that errors appear in the printed specification of the above numbered patent requiring correction as follows:

Column 4, line 14, for the word "hydrogen" read *hydrocarbon*; column 6, line 11, for "to slurry" read *of slurry*; line 67, for "this time" read *the time*; column 7, line 58, for "decomposed" read *decomposer*;

and that the said Letters Patent should be read with these corrections therein that the same may conform to the record of the case in the Patent Office.

Signed and sealed this 10th day of January, A. D. 1950.

[SEAL]

THOMAS F. MURPHY,
*Assistant Commissioner of Patents.*